United States Patent

Nakao

Patent Number: 4,917,483
Date of Patent: Apr. 17, 1990

[54] F.THETA LENS SYSTEM WITH VARIABLE FOCAL LENGTH

[75] Inventor: Sachiko Nakao, Osaka, Japan

[73] Assignee: Minolta Camera Kabushiki Kaisha, Osaka, Japan

[21] Appl. No.: 282,738

[22] Filed: Dec. 12, 1988

[30] Foreign Application Priority Data

Dec. 11, 1987 [JP] Japan .................. 62-314983

[51] Int. Cl.⁴ .................. G02B 15/14; G02B 26/10
[52] U.S. Cl. .................. 350/423; 350/6.1; 350/6.8; 350/426; 350/427
[58] Field of Search .......... 350/6.1, 6.8, 423, 426, 350/427

[56] References Cited

U.S. PATENT DOCUMENTS

| | | | |
|---|---|---|---|
| 3,750,189 | 7/1973 | Fleischer | 346/74 ES |
| 4,123,135 | 10/1978 | Rabedeau | 350/6.8 |
| 4,353,617 | 10/1982 | Tokumitsu et al. | 350/427 X |
| 4,390,235 | 6/1983 | Minoura | 350/6.1 |
| 4,643,516 | 2/1987 | Ogura | 350/6.8 X |
| 4,786,151 | 11/1988 | Hamada | 350/434 |

Primary Examiner—Scott J. Sugarman
Attorney, Agent, or Firm—Price, Gess & Ubell

[57] ABSTRACT

An $f.\theta$ lens system used in a laser beam scanning device and being capable of varying a focal length thereof. The $f.\theta$ lens system is provided between a deflector and a photosensitive medium and comprises from the deflector side a first lens unit of negative refractive power and a second lens unit of positive refractive power which are relatively moved to vary the focal length of the $f.\theta$ lens system.

21 Claims, 13 Drawing Sheets

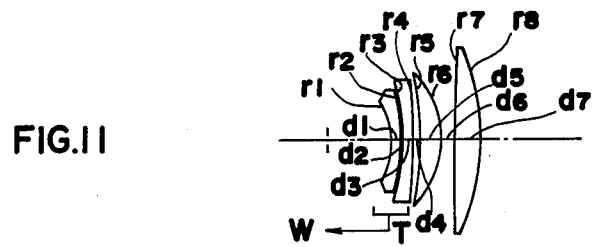
FIG.11
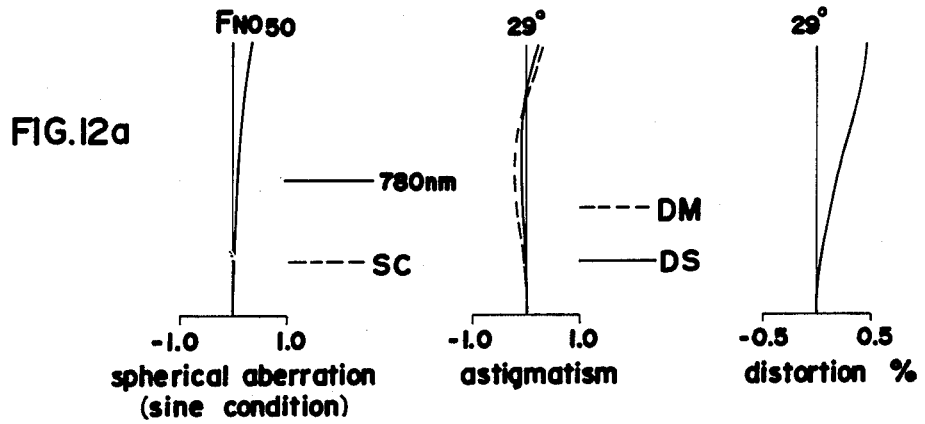
FIG.12a
FIG.12b
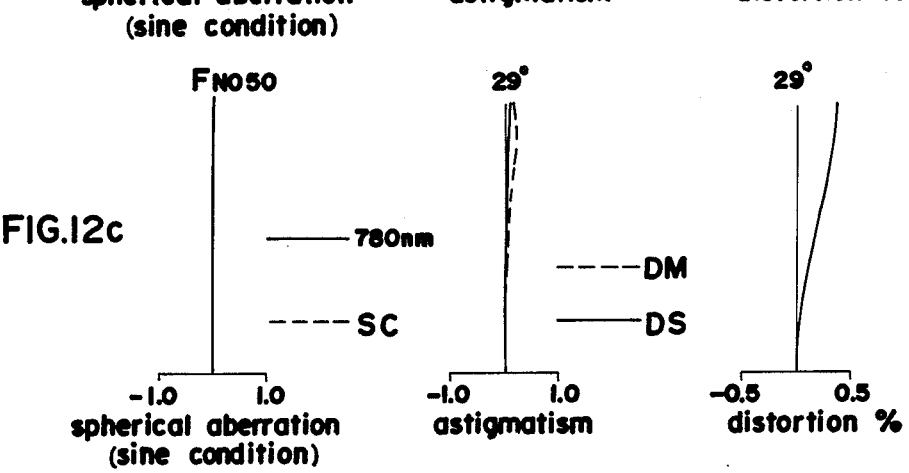
FIG.12c

F.THETA LENS SYSTEM WITH VARIABLE FOCAL LENGTH

BACKGROUND OF THE INVENTION

1. Field of the Invention

The present invention relates to an f.θ lens system for use in laser printers and the like, and more particularly to an f.θ lens system with variable focal length.

2. Description of the Related Arts

There is known a laser printer in which a photosensitive medium is scanned by laser beam modulated according to image data. The modulated laser beam is deflected by a deflector such as a polygon mirror to scan the beam and is transmitted to the photosensitive medium by a projection lens system. Such the projection lens system should have a characteristic of distortion described by y=f.θ, wherein y is image height, f is focal length of the lens system and θ is beam incident angle to the lens system, so that the beam is moved and scanned on the photosensitive medium while maintaining the moving speed thereof constant. The projection lens system may also be called the f.θ lens system. Practically, it is required for the f.θ lens system to have small difference between actual distortion and the equation y=f.θ, small astigmatism and flat image plane as possible.

The conventional f.θ lens system has been designed to have the fixed focal length, so that a magnification ratio of the projected image is kept constant. The magnification ratio has been changed by electrical modification of image data rather than by using an optical arrangement with variable magnification property. However, the electrical modification of image data is likely to result in damage of partial image data.

In the case of different size prints, the conventional laser printer has been provided with a circuitry for controlling a start timing of beam modulation and an end timing thereof by line according to a paper size to be used for printing. The control circuitry was more complex and more expensive.

SUMMARY OF THE INVENTION

Accordingly, an object of the present invention is to provide an f.θ lens system capable of varying focal length.

Another object of the present invention is to provide the f.θ lens system capable of changing the magnification ratio of the image to be projected without using an electrical data modification circuitry.

These and other objects are achieved by an f.θ lens system provided between a deflector and a photosensitive medium and including a first and second lens units aligned in this order from the deflector to the photosensitive medium, said first lens unit having negative refractive power, said second lens unit having positive refractive power, and said first and second lens units being relatively movable to vary a focal length of the f.θ lens system.

As another aspect of the present invention, the f.θ lens system is moved in it entirety while varying the distance between the first and second lens units in order to maintain constant distance between the deflector and the photosensitive medium.

BRIEF DESCRIPTION OF THE DRAWINGS

FIGS. 5, 7, 9, 11, 13, 15, 17, 19, 21, 23, 25 and 27 are diagrams in section showing the f.θ lens systems of the first to twelfth embodiments; and FIGS. 6, 8, 10, 12, 14, 16, 18, 20, 22, 24 and 26 are diagrams showing aberrations of the first to twelfth embodiments where the drawings with adscript "a" show the condition of the longest focal length, the drawings with adscript "b" show the condition of the shortest focal length, and the drawing with adscript "c" show the condition of the middle focal length.

DESCRIPTION OF THE PREFERRED EMBODIMENTS

Figure 1:
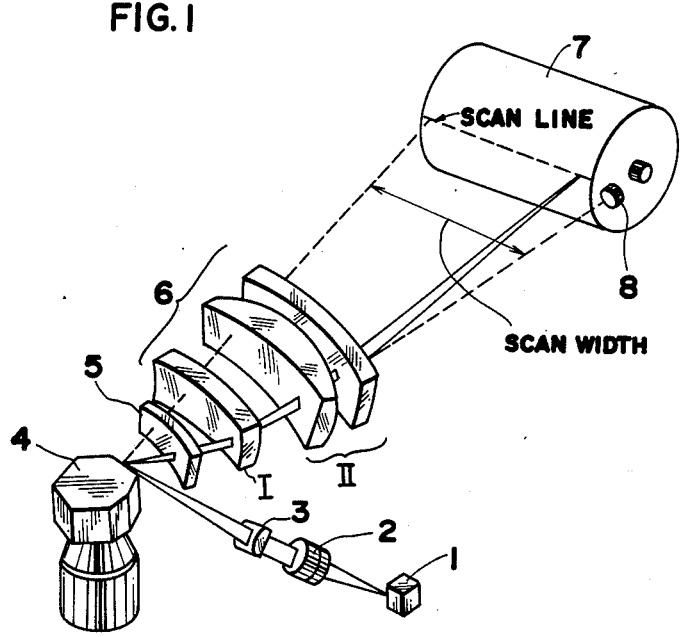
FIGS. 1 and 2 are perspective views showing optical systems including an f.θ lens system of the present invention at the longest focal length condition and the shortest focal length condition respectively.
Figure 2:
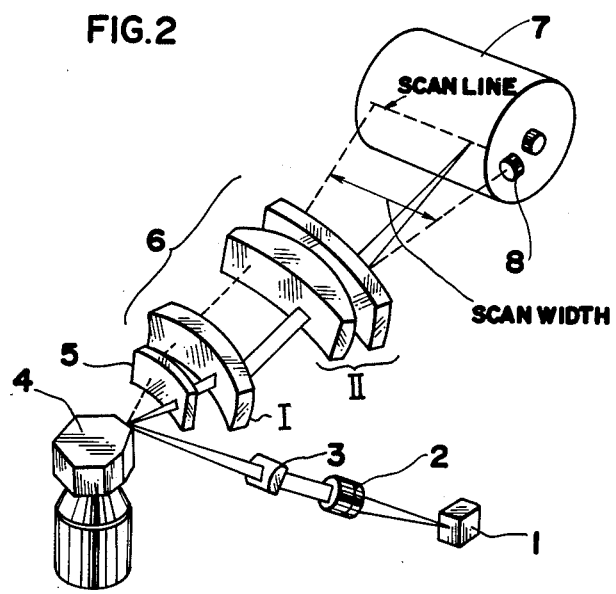
Figure 3:
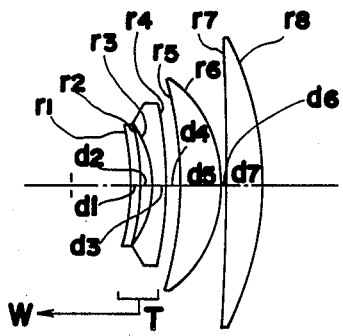
Figure 4A:
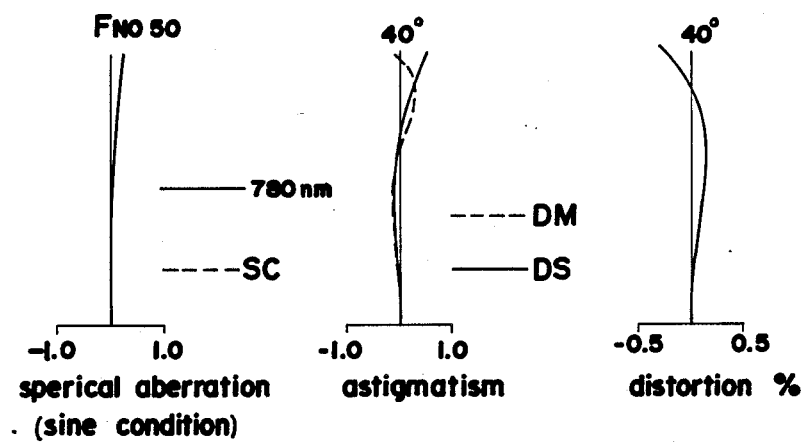
Figure 4B:
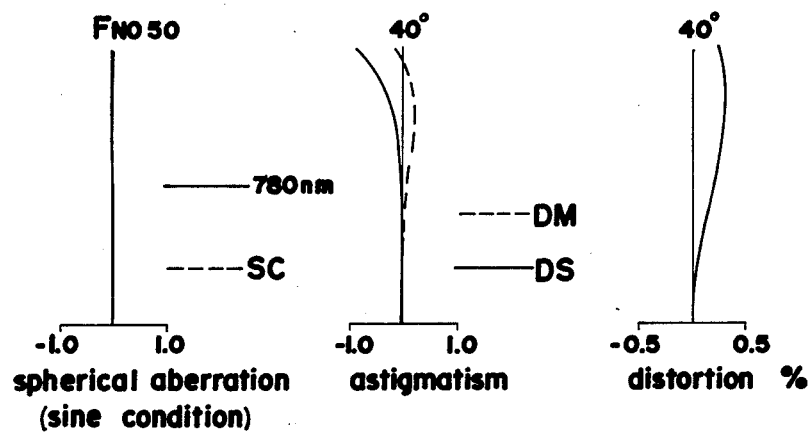
Figure 5:
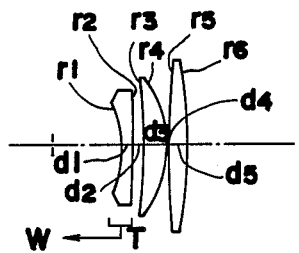
Figure 6A:
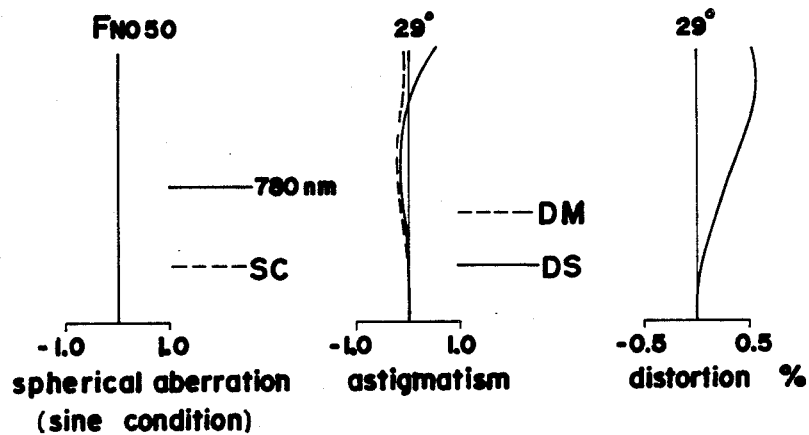
Figure 6B:
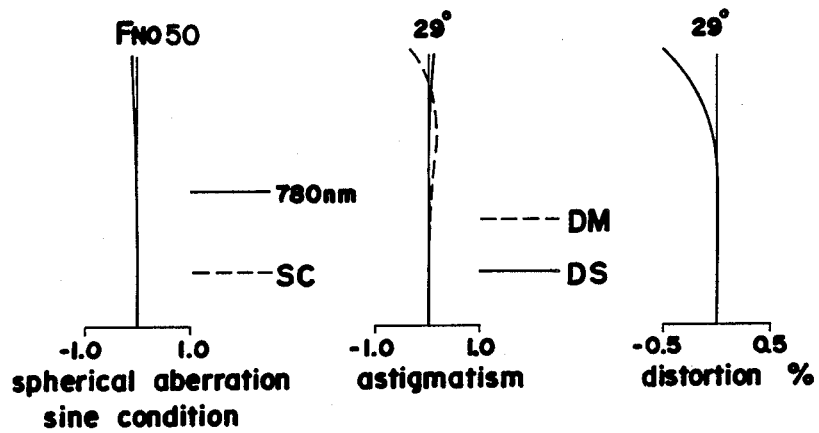
Figure 7:
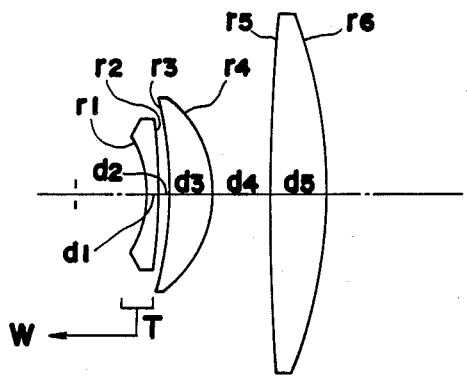
Figure 8A:
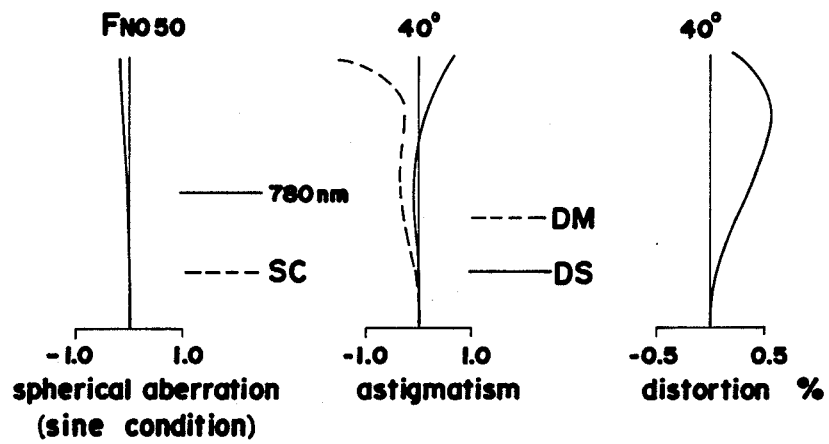
Figure 8B:
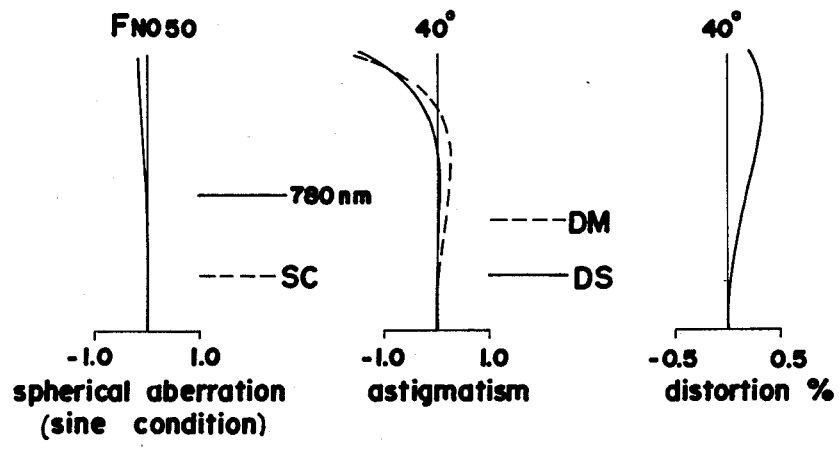
Figure 9:
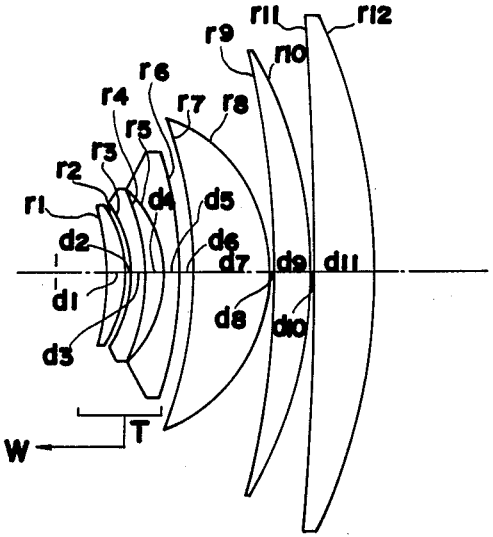
Figure 10A:
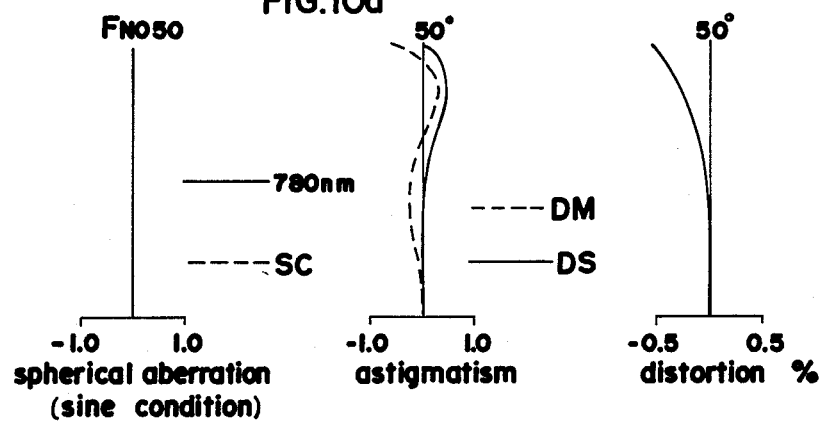
Figure 10B:
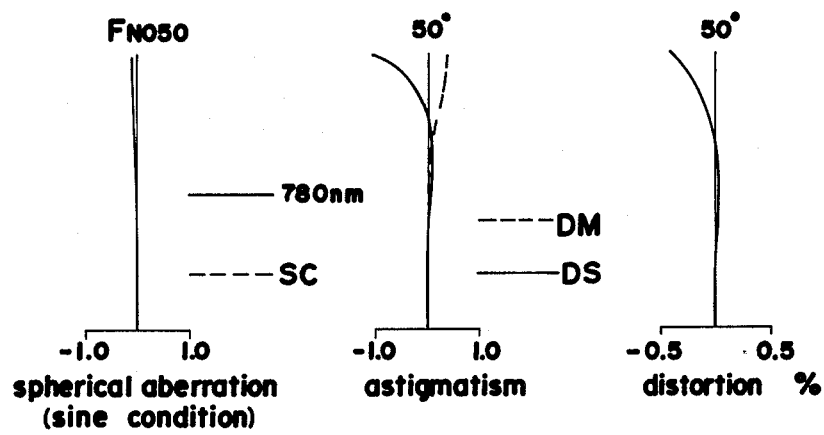
Figure 13:
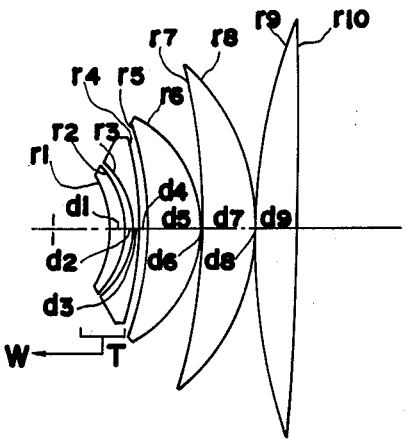
Figure 14A:
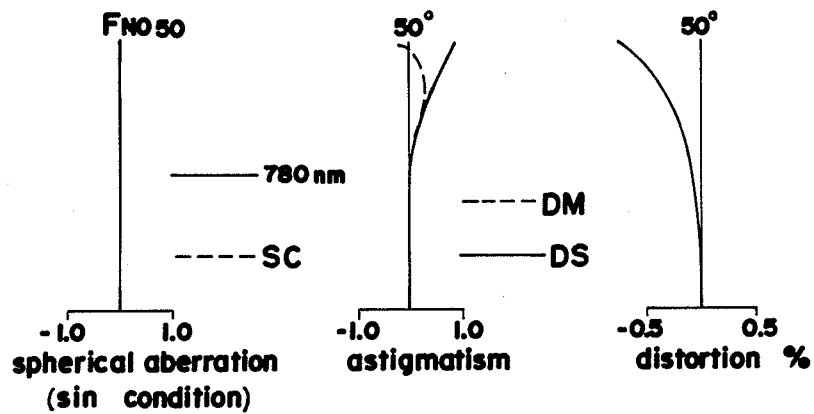
Figure 14B:
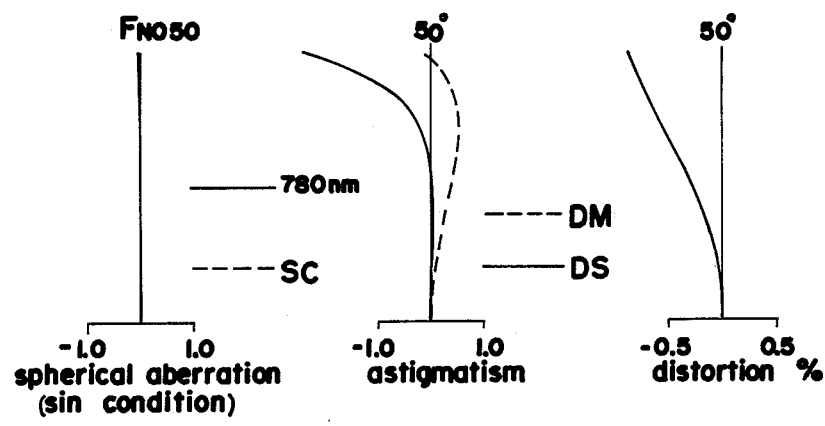
Figure 15:
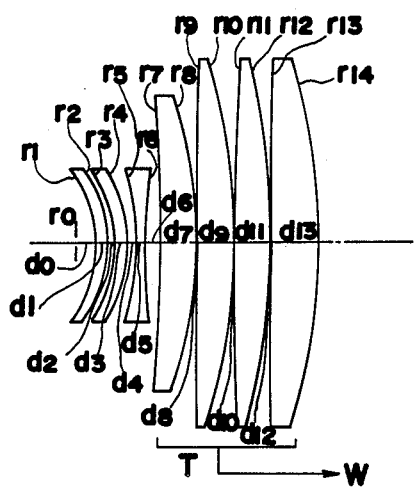
Figure 16A:
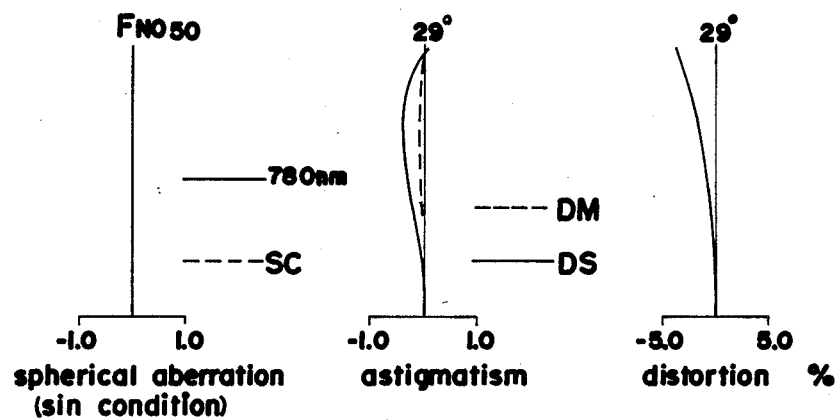
Figure 16B:
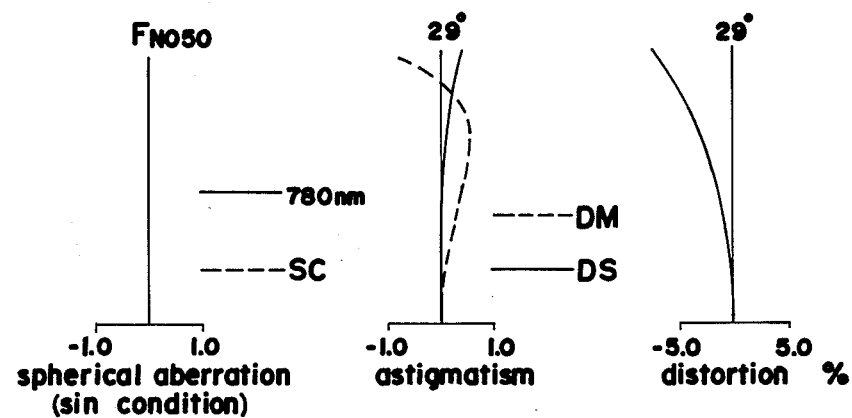
Figure 17:
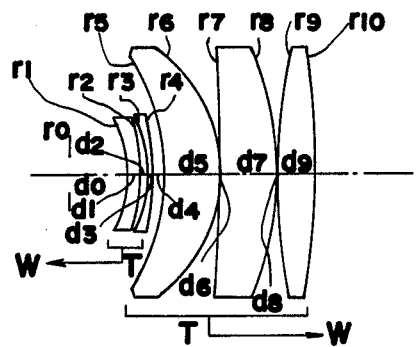
Figure 18A:
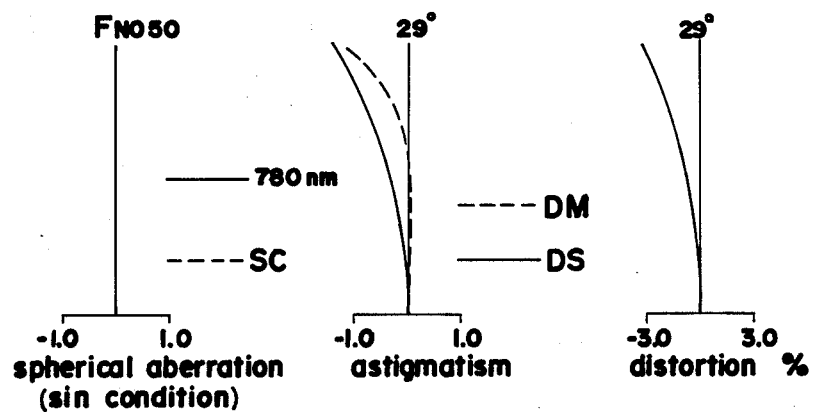
Figure 18B:
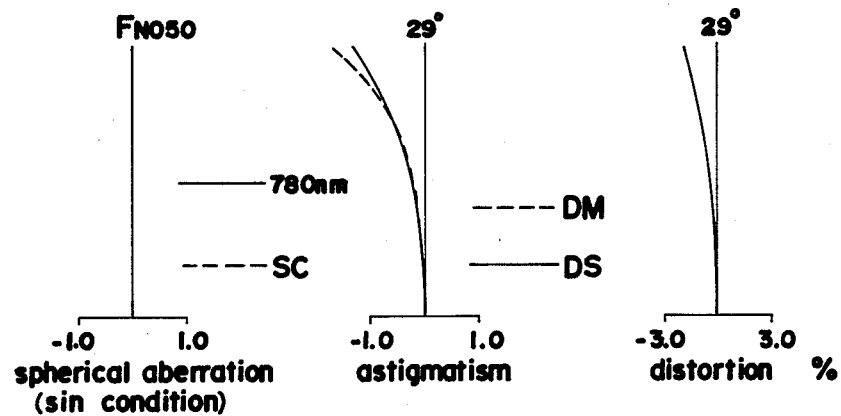
Figure 19:
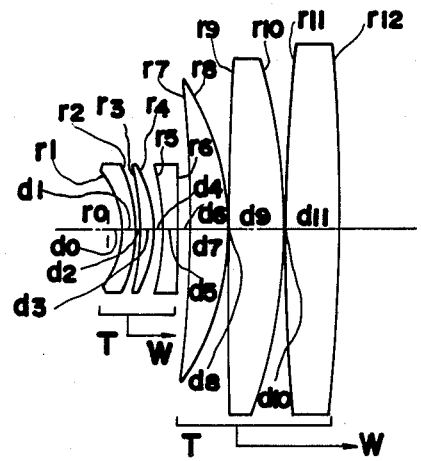
Figure 20A:
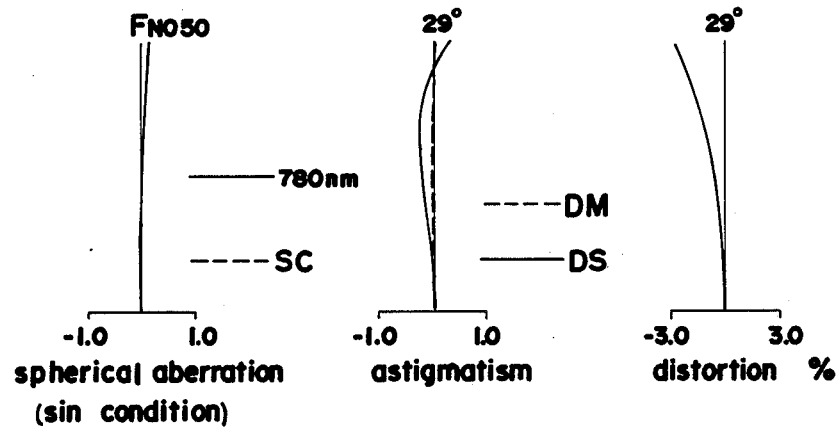
Figure 20B:
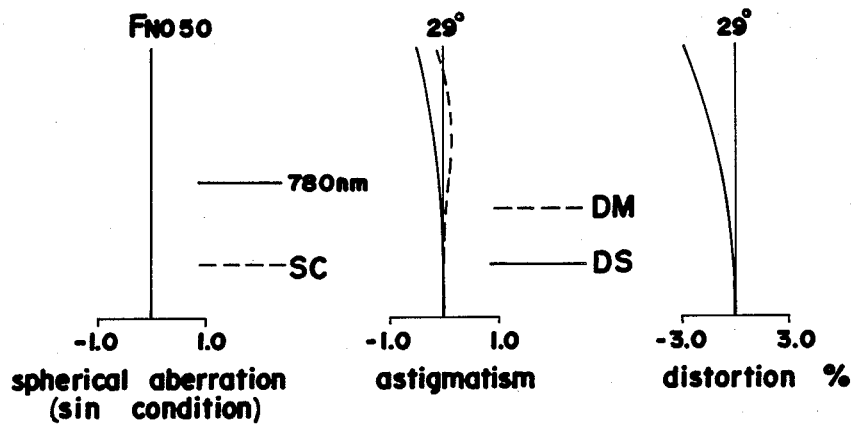
Figure 21:
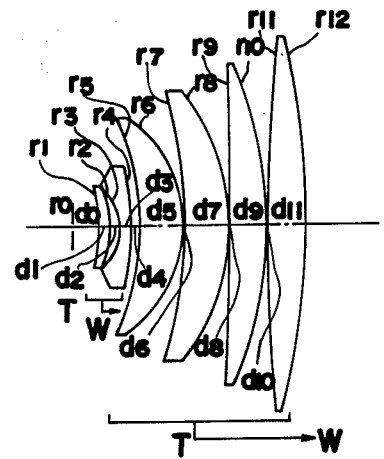
Figure 22A:
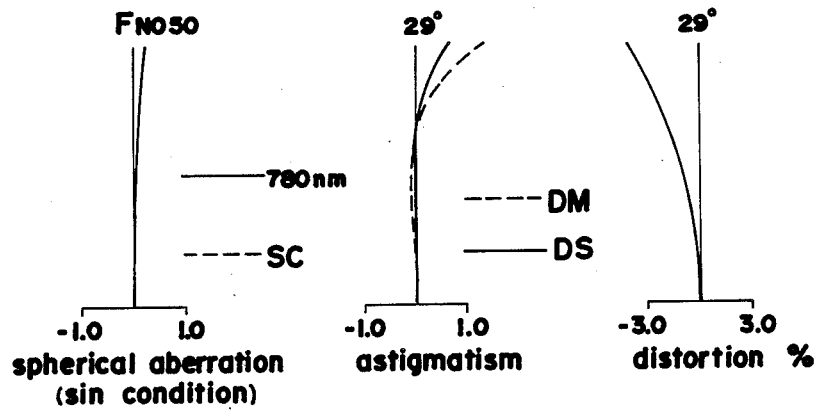
Figure 22B:
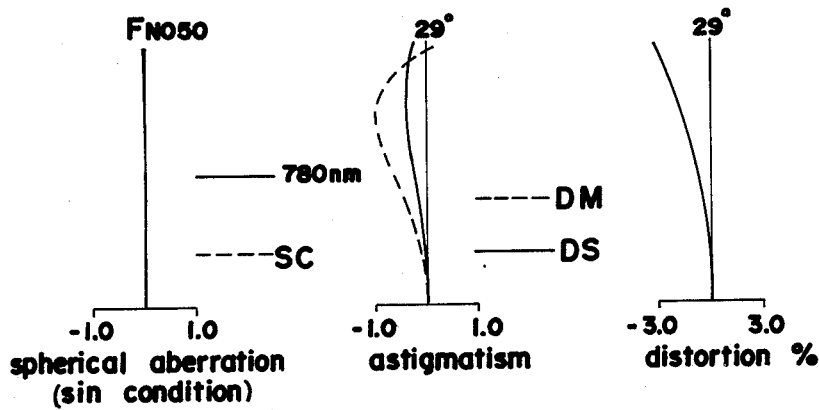
Figure 23:
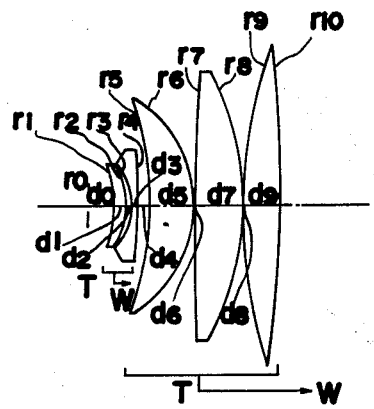
Figure 24A:
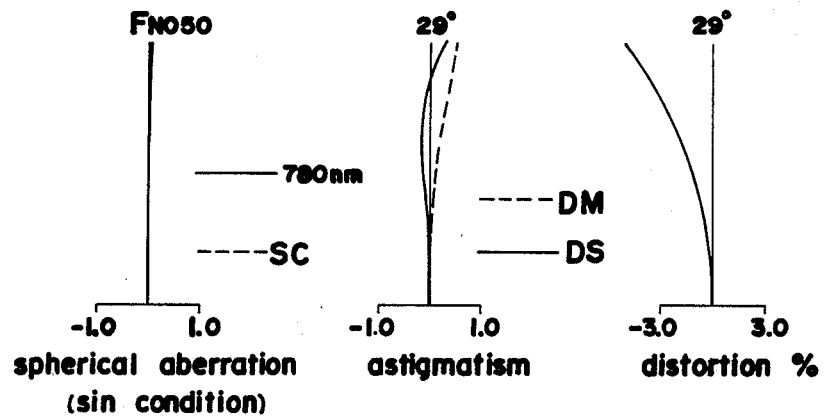
Figure 24B:
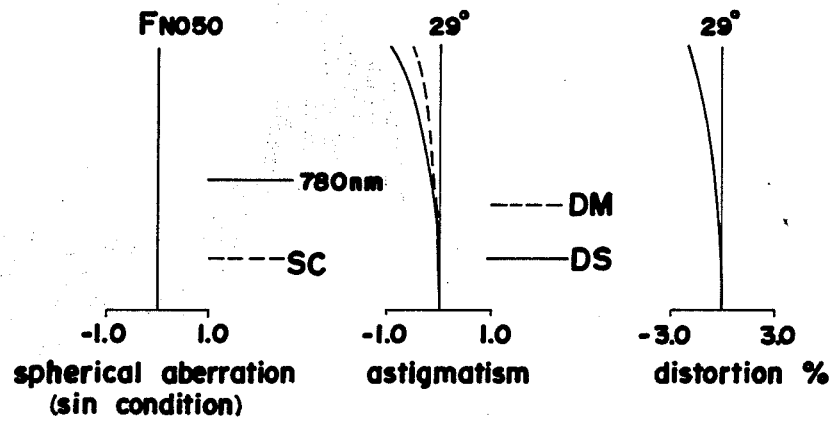
Figure 25:
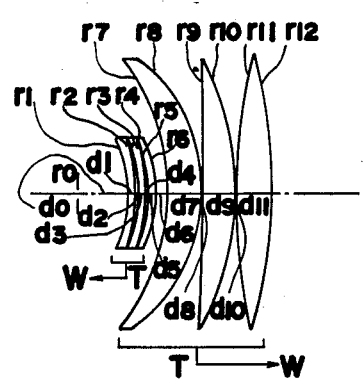
Figure 26A:
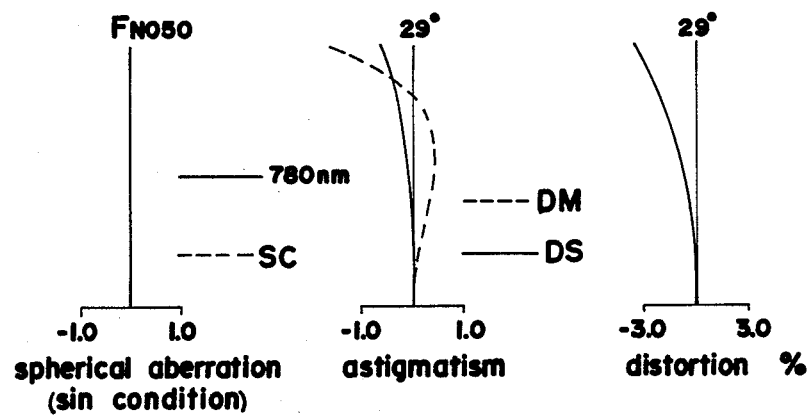
Figure 26B:
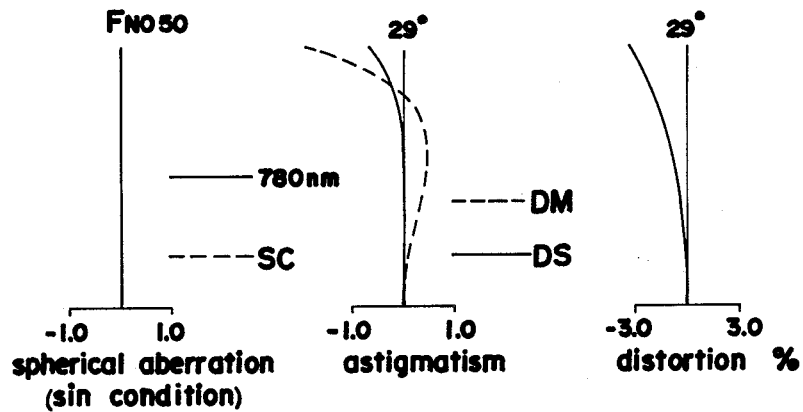

Referring to FIGS. 1 and 2, an optical system of a laser printer having an f.θ lens system of the present invention will be explained.

The numerals 1 and 7 denote a laser source such as a laser diode and a photosensitive drum between which a collimator lens 2, a cylindrical lens 3, a polygon mirror 4 as a deflector, a toroidal lens 5 and an f.θ lens system 6 of the present invention are aligned in this order on an optical path. Provided beside the photosensitive drum 7 is a sensor 8 to detect a timing of Start-of-Scan. The cylindrical lens 3 and the toroidal lens 5 cooperate to correct a tilt error of the polygon mirror 4.

Here, FIG. 1 shows the optical system in the longest focal length side and FIG. 2 shows the optical system in the shortest focal length side. Referring to FIGS. 1 and 2, the f.θ lens system 6 is composed of a first lens unit I and a second lens unit II which are movable relatively to each other so as to vary a focal length of the f.θ lens system. The first lens unit I has a negative refractive power and the second lens unit II has a positive refractive power.

In order to maintain sufficient f.θ characteristics through entire range of the focal length to be varied, it is necessary to generate negative distortion as compared with conventional lens system which satisfies the equation Y=f. tanθ. This requirement is achieved by providing the positive lens unit at the side near to the image plane, i.e., the photosensitive drum 7.

Meanwhile, it is necessary for keeping a flat image plane through the entire range of the focal length to be varied that Petzval sum becomes substantially zero. This requirement is achieved by providing the negative lens unit at the side near to the polygon mirror 4.

By the reason mentioned above, the f.θ lens system is composed of the first lens unit I of negative power and the second lens unit II of positive power in this order from the side of the polygon mirror, thereby maintaining sufficient f.θ characteristics and correcting abberations in good degree.

Further, it is required for the f.θ lens system of the present invention to fulfill the following condition:

$$-2.0 < \phi_1/\phi_2 < -0.4 \qquad (1)$$

$$-\phi_2 \cdot \Delta Z/(S-1) < 2 \qquad (2)$$

where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

The condition (1) is for maintaining the flatness of the image plane. If the lower limit of the condition (1) is violated, Petzval sum becomes negative large value to thereby result in difficulty of correction for the saggital image plane in the longest focal length side mainly. On the other hand, if the upper limit is violated, Petzval sum becomes positive large value to thereby result in difficulty of correction for the tangential image plane in the shortest focal length side mainly.

The condition (2) is for providing sufficient f.$\theta$ characteristics. The term $\Delta t/(S-1)$ represents unit change value of the distance between the first and second lens units I, II. If the condition (2) is violated by excessive increment of either the term $\Delta Z/d(S-1)$ or the refractive power of the second lens unit II, it is difficult to keep the sufficient f.$\theta$ characteristics because of occurrence of extreme negative distortion.

In order to obtain more excellent flatness of the image plane, it is necessary to fulfill the following condition:

$$-1.0 < (\phi r_1 + \phi r_2) \cdot f < 1.0$$

wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length. If the lower limit of the condition (3) is violated, petzval sum becomes large negative value, resulting in large distortion of positive side. If the upper limit is violated, it results in large positive value of petzval sum and hence large distortion of negative side.

Furthermore, the flatness of the image plane becomes most excellent if the system fulfills following condition (1') which is further limited from the condition (1):

$$-1.2 < \phi_1/\phi_2 < -0.6$$

The f.$\theta$ lens system of the present invention can be used for various purposes. For example, the f.$\theta$ lens system can be commonly used to different types of laser printers, which have different scanning widths from each other, by adjusting the focal length of the f.$\theta$ lens system. Further, the f.$\theta$ lens system can be used in installed state for altering the projection magnification, thereby achieving variable dot density and scanning width. Moreover, the f.$\theta$ lens system can be used for adjustment of correcting design error of the f.$\theta$ lens system.

Aforesaid invention is supported by twelve embodiments shown in following tables and accompanying drawings. In the tables and drawings, the radii of curvature of respective lenses are indicated by r with consecutive numbers from the polygon mirror side to the photosensitive medium side. The axial distances, d, along the optical axis are set forth in the tables and include both the axial spacings between the lenses and the thickness of the lenses. The refractive index N which is measured by a light of 780 nm are also provided in each of tables.

The embodiments 1 to 7 are illustrated as the system where either one of the first and second lens units is moved. It should be noted for these embodiments 1 to 7 that the focal points are varied in accordance with the movement of the first or second lens units. Therefore, these embodiments is preferable to the usage where the f.$\theta$ lens systems of same type are adapted to different types of laser printers. Otherwise, the f.$\theta$ lens system of these embodiments is installed in a laser printer together with a mirror system provided between the f.$\theta$ lens system and the photosensitive member to vary an optical distance therebetween for keeping in-focus condition.

The other embodiments 8 to 12 are illustrated as the system where both of the first and second lens units are moved in order to vary the focal length while keeping in-focus condition.

In the tables and drawings "T" and "W" are abbreviations for longest focal length state and shortest focal length states, respectively.

TABLE 1

| (EMBODIMENT) | | |
|---|---|---|
| f = 100~70 radius of curvature | $F_{No.}$ = 50 axial distance | 2w = 80° refractive index |
| $r_1$ −37.775 | | |
| | $d_1$ 1.89 | $N_1$ 1.60000 |
| $r_2$ −26.099 | | |
| | $d_2$ 1.89 | |
| $r_3$ −14.301 | | |
| | $d_3$ 1.89 | $N_2$ 1.73000 |
| $r_4$ −64.328 | | |
| | $d_4$ 2.36~6.59 | |
| $r_5$ −60.977 | | |
| | $d_5$ 7.08 | $N_3$ 1.60000 |
| $r_6$ −21.443 | | |
| | $d_6$ 0.47 | |
| $r_7$ −1177.4 | | |
| | $d_7$ 6.60 | $N_4$ 1.60000 |
| $r_8$ −48.367 | | |

$\phi_1/\phi_2 = -1.04$
$\phi_1 \cdot \Delta Z/(S-1) = 0.31$
$(\phi r_1 + \phi r_2) \cdot f = 0.15$ (T)
$\phantom{(\phi r_1 + \phi r_2) \cdot f =} 0.11$ (W)

TABLE 2

| (EMBODIMENT) | | |
|---|---|---|
| f = 100~70 radius of curvature | $F_{No.}$ = 50 axial distance | 2w = 58° refractive index |
| $r_1$ −14.794 | | |
| | $d_1$ | 1.67  1.70000 |
| $r_2$ −137.810 | | |
| | $d_2$ | 1.67~4.13 |
| $r_3$ −84.203 | | |
| | $d_3$ | 4.00  1.63000 |
| $r_4$ −17.331 | | |
| | $d_4$ | 0.33 |
| $r_5$ 150.575 | | |
| | $d_5$ | 3.00  1.61000 |
| $r_6$ −73.935 | | |

$\phi_1/\phi_2 = -1.01$
$\phi_2 \cdot \Delta Z/(S-1) = 0.24$
$(\phi r_1 + \phi r_2) \cdot f = -0.24$
$\phantom{(\phi r_1 + \phi r_2) \cdot f =} -0.17$ (W)

TABLE 3

| (EMBODIMENT) | | |
|---|---|---|
| f = 100~70 radius of curvature | $F_{No.}$ = 50 axial distance | 2w = 80° refractive index |
| $r_1$ −16.265 | | |
| | $d_1$ 1.89 | $N_1$ 1.73000 |
| $r_2$ −69.851 | | |
| | $d_2$ 1.65~5.69 | |
| $r_3$ −61.864 | | |
| | $d_3$ 7.55 | $N_2$ 1.59000 |
| $r_4$ −18.723 | | |
| | $d_4$ 9.43 | |
| $r_5$ 340.44 | | |
| | $d_5$ 9.43 | $N_3$ 1.60000 |

TABLE 3-continued (EMBODIMENT)

| f = 100~70 radius of curvature | | $F_{No.} = 50$ axial distance | | 2w = 80° refractive index |
|---|---|---|---|---|
| $r_6$ | −76.145 | | | |

$\phi_1/\phi_2 = -1.12$
$\phi_2 \cdot \Delta Z/(S-1) = 0.29$
$(\phi r_1 + \phi r_2) \cdot f = 0.091$ (T)
$\qquad 0.065$ (W)

TABLE 4

(EMBODIMENT)

| f = 100~70 radius of curvature | | $F_{No.} = 50$ axial distance | | 2w = 100° refractive index | |
|---|---|---|---|---|---|
| $r_1$ | −34.962 | | | | |
| | | $d_1$ | 2.94 | $N_1$ | 1.57000 |
| $r_2$ | −19.245 | | | | |
| | | $d_2$ | 1.06 | | |
| $r_3$ | −19.230 | | | | |
| | | $d_3$ | 2.35 | $N_2$ | 1.73000 |
| $r_4$ | −28.526 | | | | |
| | | $d_4$ | 3.12 | | |
| $r_5$ | −18.629 | | | | |
| | | $d_5$ | 2.35 | $N_3$ | 1.73000 |
| $r_6$ | −62.423 | | | | |
| | | $d_6$ | 2.35~9.35 | | |
| $r_7$ | −73.618 | | | | |
| | | $d_7$ | 12.94 | $N_4$ | 1.57000 |
| $r_8$ | −27.369 | | | | |
| | | $d_8$ | 0.59 | | |
| $r_9$ | −141.81 | | | | |
| | | $d_9$ | 6.47 | $N_5$ | 1.60000 |
| $r_{10}$ | −67.946 | | | | |
| | | $d_{10}$ | 0.29 | | |
| $r_{11}$ | −554.89 | | | | |
| | | $d_{11}$ | 10.00 | $N_6$ | 1.60000 |
| $r_{12}$ | −97.198 | | | | |

$\phi_1/\phi_2 = -1.09$
$\phi_1 \cdot \Delta Z/(S-1) = 0.39$
$(\phi r_1 + \phi r_2) \cdot f = 0.4$ (T)
$\qquad 0.28$ (W)

TABLE 5

(EMBODIMENT)

| f = 100~70~50 radius of curvature | | $F_{No.} = 50$ axial distance | | 2w = 58° refractive index | |
|---|---|---|---|---|---|
| $r_1$ | −11.799 | | | | |
| | | $d_1$ | 1.43 | $N_1$ | 1.73000 |
| $r_2$ | −22.502 | | | | |
| | | $d_2$ | 0.24 | | |
| $r_3$ | −31.291 | | | | |
| | | $d_3$ | 1.67 | $N_2$ | 1.71045 |
| $r_4$ | −92.356 | | | | |
| | | $d_4$ | 1.19~3.58~7.05 | | |
| $r_5$ | −61.249 | | | | |
| | | $d_5$ | 3.57 | $N_3$ | 1.48457 |
| $r_6$ | −16.186 | | | | |
| | | $d_6$ | 2.14 | | |
| $r_7$ | −3661.9 | | | | |
| | | $d_7$ | 4.31 | $N_4$ | 1.61000 |
| $r_8$ | −34.174 | | | | |

$\phi_1\phi_2 = -1.12$
$\phi_2 \cdot \Delta Z/(S-1) = 0.23$
$(\phi r_1 + \phi r_2) \cdot f = -0.022$ (T)
$\qquad -0.011$ (W)

TABLE 6

(EMBODIMENT)

| f = 100~70 radius of curvature | | $F_{No.} = 50$ axial distance | | 2w = 100° refractive index | |
|---|---|---|---|---|---|
| $r_1$ | −30.264 | | | | |
| | | $d_1$ | 4.71 | $N_1$ | 1.60000 |

TABLE 6-continued (EMBODIMENT)

| f = 100~70 radius of curvature | | $F_{No.} = 50$ axial distance | | 2w = 100° refractive index | |
|---|---|---|---|---|---|
| $r_2$ | −28.316 | | | | |
| | | $d_2$ | 2.35 | | |
| $r_3$ | −25.909 | | | | |
| | | $d_3$ | 2.35 | $N_2$ | 1.67000 |
| $r_4$ | −95.697 | | | | |
| | | $d_4$ | 3.53~17.12 | | |
| $r_5$ | −86.420 | | | | |
| | | $d_5$ | 16.47 | $N_3$ | 1.65000 |
| $r_6$ | −41.406 | | | | |
| | | $d_6$ | 0.59 | | |
| $r_7$ | −200.09 | | | | |
| | | $d_7$ | 18.24 | $N_4$ | 1.60000 |
| $r_8$ | −68.262 | | | | |
| | | $d_8$ | 0.29 | | |
| $r_9$ | 210.95 | | | | |
| | | $d_9$ | 13.53 | $N_5$ | 1.60000 |
| $r_{10}$ | −1909.1 | | | | |

$\phi_1/\phi_2 = -0.94$
$\phi_2 \cdot \Delta Z/(S-1) = 0.59$
$(\phi r_1 + \phi r_2) \cdot f = -0.052$ (T)
$\qquad -0.037$ (W)

TABLE 7

(EMBODIMENT)

| f = 100~70 radius of curvature | | $F_{No.} = 50$ axial distance | | 2w = 58° refractive index |
|---|---|---|---|---|
| $r_0$ | ∞ | | | |
| | | $d_0$ | 3.33 | |
| $r_1$ | −22.270 | | | |
| | | $d_1$ | 2.17 | 1.60000 |
| $r_2$ | −22.139 | | | |
| | | $d_2$ | 1.33 | |
| $r_3$ | −23.866 | | | |
| | | $d_3$ | 2.33 | 1.60000 |
| $r_4$ | −25.407 | | | |
| | | $d_4$ | 1.67 | |
| $r_5$ | −43.525 | | | |
| | | $d_5$ | 1.67 | 1.60000 |
| $r_6$ | 177.55 | | | |
| | | $d_6$ | 2.67~13.69 | |
| $r_7$ | −324.28 | | | |
| | | $d_7$ | 6.67 | 1.65000 |
| $r_8$ | −85.592 | | | |
| | | $d_8$ | 0.33 | |
| $r_9$ | −12915. | | | |
| | | $d_9$ | 6.77 | 1.64000 |
| $r_{10}$ | −115.38 | | | |
| | | $d_{10}$ | 0.29 | |
| $r_{11}$ | 758.64 | | | |
| | | $d_{11}$ | 6.67 | 1.60000 |
| $r_{12}$ | −136.79 | | | |
| | | $d_{12}$ | 0.33 | |
| $r_{13}$ | −2632. | | | |
| | | $d_{13}$ | 8.33 | |
| $r_{14}$ | −118.01 | | | |

$\phi_1/\phi_2 = -0.86$
$\phi_2 \cdot \Delta Z/(S-1) = 0.538$
$(\phi r_1 + \phi r_2) \cdot f = -0.538$ (T)
$\qquad -0.377$ (W)

TABLE 8

(EMBODIMENT)

| f = 100~70 radius of curvature | | $F_{No.} = 50$ axial distance | | 2w = 58° refractive index |
|---|---|---|---|---|
| $r_0$ | ∞ | | | |
| | | $d_0$ | 20.00~5.18 | |
| $r_1$ | −40.603 | | | |
| | | $d_1$ | 4.71 | 1.6000000 |
| $r_2$ | −55.421 | | | |
| | | $d_2$ | 2.35 | |
| $r_3$ | −46.421 | | | |

TABLE 8-continued (EMBODIMENT)

| f = 100~70 radius of curvature | | $F_{No.} = 50$ axial distance | | 2w = 58° refractive index |
|---|---|---|---|---|
| $r_4$ | −80.026 | | | |
| | | $d_3$ | 2.35 | 1.600000 |
| $r_5$ | −79.012 | | | |
| | | $d_4$ | 3.53~37.77 | |
| $r_6$ | −58.090 | | | |
| | | $d_5$ | 20.00 | 1.65000 |
| $r_7$ | −537.28 | | | |
| | | $d_6$ | 0.59 | |
| $r_8$ | −111.38 | | | |
| | | $d_7$ | 22.00 | 1.63000 |
| $r_9$ | 219.88 | | | |
| | | $d_8$ | 0.29 | |
| $r_{10}$ | −256.74 | | | |
| | | $d_9$ | 13.53 | 1.60000 |

$\phi_1/\phi_2 = -0.647$
$\phi_2 \cdot \Delta Z/(S-1) = 1.11$
$(\phi r_1 + \phi r_2) \cdot f = -0.073$ (T)
            $-0.051$ (W)

TABLE 9

(EMBODIMENT)

| f = 100~70 radius of curvature | | $F_{No.} = 50$ axial distance | | 2w = 58° refractive index |
|---|---|---|---|---|
| $r_0$ | ∞ | | | |
| | | $d_0$ | 2.67~12.33 | |
| $r_1$ | −16.762 | | | |
| | | $d_1$ | 2.17 | 1.60000 |
| $r_2$ | −28.701 | | | |
| | | $d_2$ | 1.33 | |
| $r_3$ | −41.740 | | | |
| | | $d_3$ | 2.33 | 1.60000 |
| $r_4$ | −23.835 | | | |
| | | $d_4$ | 2.00 | |
| $r_5$ | −37.347 | | | |
| | | $d_5$ | 2.67 | 1.60000 |
| $r_6$ | −188.53 | | | |
| | | $d_6$ | 2.33~16.14 | |
| $r_7$ | −194.24 | | | |
| | | $d_7$ | 6.67 | 1.65000 |
| $r_8$ | −50.758 | | | |
| | | $d_8$ | 0.33 | |
| $r_9$ | 3488.9 | | | |
| | | $d_9$ | 10.00 | 1.64000 |
| $r_{10}$ | −108.55 | | | |
| | | $d_{10}$ | 0.29 | |
| $r_{11}$ | 332.53 | | | |
| | | $d_{11}$ | 10.00 | 1.73000 |
| $r_{12}$ | −326.66 | | | |

$\phi_1/\phi_2 = -0.800037$
$\phi_2 \cdot \Delta Z/(S-1) = 0.624$
$(\phi r_1 + \phi r_2) \cdot f = -0.0164$ (T)
            $-0.0115$ (W)

TABLE 10

(EMBODIMENT)

| f = 100~70 radius of curvature | | $F_{No.} = 50$ axial distance | | 2w = 58° refractive index |
|---|---|---|---|---|
| $r_0$ | ∞ | | | |
| | | $d_0$ | 10.00~24.75 | |
| $r_1$ | −65.331 | | | |
| | | $d_1$ | 4.71 | $n_1$ 1.60000 |
| $r_2$ | −31.880 | | | |
| | | $d_2$ | 4.00 | |
| $r_3$ | −18.857 | | | |
| | | $d_3$ | 3.80 | $n_2$ 1.67000 |
| $r_4$ | −88.425 | | | |
| | | $d_4$ | 3.50~17.92 | |
| $r_5$ | −94.426 | | | |
| | | $d_5$ | 16.47 | $n_3$ 1.65000 |
| $r_6$ | −49.334 | | | |
| | | $d_5$ | 0.50 | |

TABLE 10-continued (EMBODIMENT)

| f = 100~70 radius of curvature | | $F_{No.} = 50$ axial distance | | 2w = 58° refractive index |
|---|---|---|---|---|
| $r_7$ | −173.86 | | | |
| | | $d_7$ | 17.00 | $n_3$ 1.60000 |
| $r_8$ | −78.584 | | | |
| | | $d_8$ | 0.29 | |
| $r_9$ | −2461.05 | | | |
| | | $d_9$ | 14.50 | $n_5$ 1.60000 |
| $r_{10}$ | −143.20 | | | |
| | | $d_{10}$ | 0.50 | |
| $r_{11}$ | 671.00 | | | |
| | | $d_{11}$ | 15.00 | $n_6$ 1.60000 |
| $r_{12}$ | −274.69 | | | |

$\phi_1/\phi_2 = -$
$\phi_2 \cdot \Delta Z/(S-1) = 0.588$
$\phi r_1 + \phi r_2) \cdot f = 0.069$ (T)
            $0.048$ (W)

TABLE 11

(EMBODIMENT)

| f = 100~70 radius of curvature | | $F_{No.} = 50$ axial distance | | 2w = 58° refractive index |
|---|---|---|---|---|
| $r_0$ | ∞ | | | |
| $r_1$ | −44.672 | | | |
| | | $d_1$ | 10.00~23.44 | $n_1$ 1.60000 |
| $r_2$ | −26.568 | | | |
| | | $d_2$ | 4.71 | |
| $r_3$ | −21.765 | | | |
| | | $d_3$ | 2.35 | |
| $r_4$ | −160.43 | | | |
| | | $d_4$ | 2.35 | $n_2$ 1.67000 |
| $r_5$ | −107.32 | | | |
| | | $d_5$ | 5.00~18.90 | |
| $r_6$ | −47.811 | | | |
| | | $d_6$ | 16.47 | $n_3$ 1.65000 |
| $r_7$ | 1168.6 | | | |
| | | $d_7$ | 0.59 | |
| $r_8$ | −106.36 | | | |
| | | $d_8$ | 18.24 | $n_4$ 1.60000 |
| $r_9$ | 186.73 | | | |
| | | $d_9$ | 0.29 | |
| $r_{10}$ | −448.46 | | | |
| | | $d_{10}$ | 14.50 | $n_5$ 1.60000 |

$\phi_1/\phi_2 = -0.911$
$\phi_2 \cdot \Delta Z/(S-1) = 0.597$
$\phi r_1 + \phi r_2) \cdot f = -0.188$ (T)
            $-0.132$ (W)

TABLE 12

(EMBODIMENT)

| f = 100~70 radius of curvature | | $F_{No.} = 50$ axial distance | | 2w = 58° refractive index |
|---|---|---|---|---|
| $r_0$ | ∞ | | | |
| | | $d_0$ | 20.00~8.39 | |
| $r_1$ | −42.621 | | | |
| | | $d_1$ | 2.50 | $n_1$ 1.60000 |
| $r_2$ | −75.817 | | | |
| | | $d_2$ | 1.50 | |
| $r_3$ | −33.229 | | | |
| | | $d_3$ | 2.00 | $n_2$ 1.60000 |
| $r_4$ | −81.522 | | | |
| | | $d_4$ | 1.50 | |
| $r_5$ | −46.945 | | | |
| | | $d_5$ | 3.50 | $n_3$ 1.60000 |
| $r_6$ | −37.449 | | | |
| | | $d_6$ | 3.53~35.06 | |
| $r_7$ | −79.655 | | | |
| | | $d_7$ | 13.00 | $n_4$ 1.65000 |
| $r_8$ | −63.433 | | | |
| | | $d_8$ | 0.59 | |
| $r_9$ | −1262.9 | | | |
| | | $d_9$ | 13.00 | $n_5$ 1.63000 |

TABLE 12-continued
(EMBODIMENT)

| f = 100~70 radius of curvature | $F_{No.}$ = 50 axial distance | 2w = 58° refractive index |
|---|---|---|
| $r_{10}$  −101.18 | | |
| | $d_{10}$  0.29 | |
| $r_{11}$  231.61 | | |
| | $d_{11}$  13.53 | $n_6$  1.60000 |
| $r_{12}$  −196.74 | | |

$\phi_1/\phi_2 = -0.644$
$\phi_2 \cdot \Delta Z/(S-1) = 1.052$
$(\phi r_1 + \phi r_2) \cdot f = 0.784$ (T)
$\phantom{(\phi r_1 + \phi r_2) \cdot f =} 0.549$ (W)

What is claimed is:

1. An f.θ lens system for use in a laser beam scanning device including a deflector by which laser beam is deflected so as to scan an image plane, the f.θ lens system comprising from the deflector side:
    a first lens unit of negative refractive power;
    a second lens unit of positive refractive power;
    said first and second lens units being relatively movable to vary a focal length of the f.θ lens system.

2. An f.θ lens system as claimed in claim 1, wherein the first and second lens units are so moved that the distance between the first and second lens units is increased when a focal length is made larger.

3. An f.θ lens system as claimed in claim 1 further fulfilling following conditions:

$-2.0 < \phi_1/\phi_2 < -0.4$ $-\phi_2 \cdot \Delta Z/(S-1) < 2$ where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

4. An f.θ lens system as claimed in claim 3 further fulfilling following conditions:

$-1.0 < (\phi r_1 + \phi r_2) \cdot f < 1.0$ wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length 5. An f.θ lens system as claimed in claim 1 further fulfilling following conditions:

$-1.2 < \phi_1/\phi_2 < 0.6$ $-\phi_2 \cdot \Delta Z/(S-1) < 2$ where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

6. An f.θ lens system as claimed in claim 5 further fulfilling following conditions:

$;31 1.0 < (\phi r_1 + \phi r_2) \cdot f < 1.0$ wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

7. An f.θ lens system for use in a laser beam scanning device including a deflector by which laser beam is deflected so as to scan an image plane, the f.θ lens system comprising from the deflector side:
    a first lens unit having negative refractive power and being movable along an optical path;
    a second lens unit having positive refractive power and fixedly provided on the optical path; and
    said first lens unit being moved so as to expand the distance between the first and second lens units when a focal length is made larger.

8. An f.θ lens system as claimed in claim 7 further fulfilling following conditions:

$-2.0 < \phi_1/\phi_2 < -0.4$ $-\phi_2 \cdot \Delta Z/(S-1) < 2$ where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

9. An f.θ lens system as claimed in claim 8 further fulfilling following conditions:

$-1.0 < (\phi r_1 + \phi r_2) \cdot f < 1.0$ wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

10. An f.θ lens system as claimed in claim 7 further fulfilling following conditions:

$-1.2 < \phi_1/\phi_2 < -0.6$ $-\phi_2 \cdot \Delta Z/(S-1) < 2$ where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

11. An f.θ lens system as claimed in claim 10 further fulfilling following conditions:

$-1.0 < (\phi r_1 + \phi r_2) \cdot f < 1.0$ wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

12. An f.θ lens system for use in a laser beam scanning device including a deflector by which laser beam is deflected so as to scan an image plane, the f.θ lens system comprising from the deflector side:

a first lens unit having negative refractive power and fixed provided on an optical path;

a second lens unit having positive refractive power and being movable along the optical path; and said second lens unit being moved so as to expand the distance between the first and second lens units when a focal length is made larger.

13. An f.θ lens system as claimed in claim 12 further fulfilling following conditions:

$$-2.0 < \phi_1/\phi_2 < -0.4$$

$$-\phi_2 \cdot \Delta Z/(S-1) < 2$$

where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

14. An f.θ lens system as claimed in claim 13 further fulfilling following conditions:

$$-1.0 < (\phi r_1 + \phi r_2) \cdot f < 1.0$$

wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

15. An f.θ lens system as claimed in claim 12 further fulfilling following conditions:

$$-1.2 < \phi 1/\phi_2 < -0.6$$

$$-\phi_2 \cdot \Delta Z/(S-1) < 2$$

where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

16. An f.θ lens system as claimed in claim 15 further fulfilling following conditions:

$$-1.0 < (\phi r_1 + \phi r_2) \cdot f < 1.0$$

wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

17. An f.θ lens system for use in a laser beam scanning device including a deflector by which laser beam is deflected so as to scan an image plane, the f.θ lens system comprising from the deflector side:

a first lens unit having negative refractive power and being movable along an optical path;

a second lens unit having positive refractive power and being movable along the optical path; and the first and second lens units are so moved that the distance between the first and second lens units is increased when a focal length is made larger.

18. An f.θ lens system as claimed in claim 17 further fulfilling following conditions:

$$-2.0 < \phi_1/\phi_2 < -0.4$$

$$-\phi_2 \cdot \Delta Z/(S-1) < 2$$

where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

19. An f.θ lens system as claimed in claim 18 further fulfilling following conditions:

$$-1.0 < (\phi r_1 + \phi r_2) \cdot f < 1.0$$

wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit 11 and f is a total focal length.

20. An f.θ lens system as claimed in claim 17 further fulfilling following conditions:

$$-1.2 < \phi_1/\phi_2 < -0.6$$

$$-\phi_2 \cdot \Delta Z/(S-1) < 2$$

where $\phi_1$ and $\phi_2$ are refractive powers of the first and second lens units respectively, $\Delta Z$ is the difference of the minimum distance which is a distance between the first and second lens unit I, II in the closest relation from the maximum distance which is a distance between the first and second lens units I, II in the farthest relation, and S is the ratio of the longest focal length to the shortest focal length.

21. An f.74 lens system as claimed in claim 20 further fulfilling following conditions:

$$-1.0 < (\phi r_1 + \phi r_2) \cdot f < 1.0$$

wherein $\phi r_1$ is a refractive power of a lens surface which is a surface most close to the image plane out of the surfaces of the first lens unit I, $\phi r_2$ is a refractive power of a lens surface which is a surface most close to the polygon mirror out of the surfaces of the second lens unit II and f is a total focal length.

* * * * *